United States Patent
Watanabe et al.

(10) Patent No.: US 6,888,028 B2
(45) Date of Patent: May 3, 2005

(54) PROCESS FOR PREPARATION POLYISOCYANATE COMPOSITION

(75) Inventors: Shinichiro Watanabe, Nobeoka (JP); Kunio Naoi, Nobeoka (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/399,519

(22) PCT Filed: Oct. 16, 2001

(86) PCT No.: PCT/JP01/09075
§ 371 (c)(1),
(2), (4) Date: Apr. 17, 2003

(87) PCT Pub. No.: WO02/32979
PCT Pub. Date: Apr. 25, 2002

(65) Prior Publication Data
US 2004/0014927 A1 Jan. 22, 2004

(30) Foreign Application Priority Data
Oct. 17, 2000 (JP) ........................................ 2000-316291

(51) Int. Cl.$^7$ .................... C07C 269/02; C07C 271/66; C07C 273/00; C07C 275/60; C08G 18/22
(52) U.S. Cl. .......................... 564/44; 528/56; 560/115; 560/157; 560/158; 564/45
(58) Field of Search .................. 528/56; 560/115, 560/157, 158; 564/44, 45

(56) References Cited

U.S. PATENT DOCUMENTS

| | | | |
|---|---|---|---|
| 3,673,159 A | * 6/1972 | Dijkhuizen et al. | 528/55 |
| 3,769,318 A | 10/1973 | Windemuth et al. | 528/44 |
| 5,064,871 A | * 11/1991 | Sciangola | 521/124 |
| 5,663,272 A | 9/1997 | Slack et al. | 528/69 |
| 5,859,163 A | 1/1999 | Slack et al. | 528/49 |
| 6,410,778 B2 | * 6/2002 | Laqua et al. | 560/115 |
| 6,469,121 B1 | * 10/2002 | Speier et al. | 528/56 |
| 6,590,057 B1 | * 7/2003 | Brecht et al. | 528/52 |

FOREIGN PATENT DOCUMENTS

| | | |
|---|---|---|
| GB | 994890 A | 6/1965 |
| JP | 46-1671 A | 9/1971 |
| JP | 61-151179 A | 7/1986 |
| JP | 10-66155 A | 3/1989 |
| JP | 7-304728 A | 11/1995 |
| JP | 8-52939 A | 2/1996 |
| JP | 8-188566 A | 7/1996 |
| JP | 2001-64352 A | 3/2001 |
| WO | WO 97/46517 A1 | 11/1997 |

* cited by examiner

Primary Examiner—Rabon Sergent
(74) Attorney, Agent, or Firm—Birch, Stewart, Kolasch & Birch, LLP

(57) ABSTRACT

Using at least one compound selected from the group consisting of a zirconyl compound and a zirconium alcoholate as an allophanation catalyst, an allophanate group-containing polyisocyanate composition is produced from a starting material of at least one isocyanate compound selected from the group consisting of an aliphatic diisocyanate, an alicyclic diisocyanate and an isocyanate pre-polymer obtained therefrom, and another starting material of a hydroxyl group-containing compound.

5 Claims, No Drawings

PROCESS FOR PREPARATION POLYISOCYANATE COMPOSITION

This application is a national phase under 35 U.S.C. § 371 of PCT International Application No. PCT/JP01/09075 which has an International filing date of Oct. 16, 2001, which designated the United States of America.

TECHNICAL FIELD

The present invention relates to a process for producing an allophanate group-containing polyisocyanate composition. Particularly, the present invention relates to a process for producing an allophanate group-containing polyisocyanate composition comprising using at least one compound selected from the group consisting of a specific zirconyl compound and a zirconium alcoholate as an allophanation catalyst, and a coating composition comprising the polyisocyanate composition obtained by said process and a polyol.

BACKGROUND ART

With respect to a production method of an allophanate group-containing polyisocyanate composition, mainly two methods are well known. That is, there are known a process wherein an urethane group-containing organic compound and an isocyanate group-containing organic compound are allowed to react with each other under heating, and a process wherein reaction between an urethane group-containing organic compound and an isocyanate group-containing organic compound is carried out by using an allophanation catalyst, which are disclosed in British Patent No. 994,890, JP-A 46-1671, JP-A 64-66155, JP-A 7-304728 and JP-A 8-188566.

In British Patent No. 994,890, there is disclosed a process wherein a mixture of a mono- or polyhydric alcohol and a diisocyanate is subjected to allophanation by heating or using an allophanation catalyst according to the above-mentioned process. In said British Patent, a carboxylate of a metal such as zirconium, a metal chelate and a tertiary amine are disclosed as the allophanation catalyst. However, there is no description relating to the zirconyl compound and the zirconium alcoholate specified in the present invention.

Further, in Examples of said British Patent, there are disclosed a process wherein heating is carried out at 130 to 135° C. for 24 hours to complete an allophanation reaction of hexamethylene diisocyanate, and a process wherein using a tertiary amine or a zinc carboxylate as the allophanation catalyst, reaction is carried out at room temperature to 50° C. for 69 to 89 hours. However, according to these processes, not only the allophanate group-containing polyisocyanate composition, but also an urethodione group- or isocyanurate group-containing polyisocyanate composition is produced to a considerable extent. Moreover, the obtained polyisocyanate composition is considerably colored.

Furthermore, in said British Patent, there is no disclosure of any condition under which a polyisocyanate composition high in a production ratio of an allophanate group can be produced. According to the present inventors' follow-up examination, the production ratio of an allophanate group was found to be about 45 to 60% when zinc carboxylate was used.

In JP-A 46-1671, there is disclosed a process wherein an isocyanate compound having an isocyanate group bound to at least one aromatic ring is subjected to allophanation in the presence of a compound having an alkylation ability as the allophanation catalyst, and if necessary, further in the presence of a Group III, IV-A, II, VI or VII-B metal compound.

As an example of the metal compound, zirconium tetrapropiolate is disclosed in said Japanese Patent Application, and in Examples thereof, zirconium acetylacetonate (tetrakis (2,4-pentanedionate) zirconium (IV)) is used. However, this compound is only added complementarily to the alkylation ability-having compound of the allophanation catalyst. Further, the present inventors have confirmed that an allophanation reaction does not proceed with the aid of the zirconium acetylacetonate. Furthermore, in said Japanese Patent Application, it is noted that application of an isocyanate other than an isocyanate group bound to an aromatic ring is excluded. Thus, JP-A 46-1671 is entirely silent about the fact that an aliphatic or alicyclic diisocyanate, and either a zirconyl compound or a zirconium alcoholate as specified in the present invention are used as a starting material and the allophanation catalyst, respectively, thereby producing an allophanate group-containing polyisocyanate composition.

In JP-A 64-66155, there is disclosed a process comprising carrying out heating at a high temperature for a short period of time without use of the allophanation catalyst, thereby attaining a relatively limited amount of coloration and diminishing the formation of urethodione to an extreme degree. However, in said Japanese Patent Application, it is disclosed that the production ratio of the allophanate group is not always high.

In JP-A 7-304728, an allophanation catalyst having a tin compound is disclosed, and it is disclosed that the tin compound is used as the allophanation catalyst to obtain an allophanate group-containing polyisocyanate composition. However, in JP-A 7-304728, there is no disclosure concerning the zirconyl compound and the zirconium alcoholate specified in the present invention.

In JP-A 8-188156, there is disclosed a process comprising using an organic metal carboxylate and an organic phosphorous acid ester as the allophanation catalyst. In said Japanese Patent Application, it is disclosed that according to the reaction using the organic metal carboxylate and the organic phosphorous acid ester, a polyisocyanate composition substantially free from urethodionation or isocyanuration is produced. However, in said JP-A 8-188156, there is no disclosure that the zirconyl compound or the zirconium alcoholate specified in the present invention is used as the allophanation catalyst, and in all of the Examples thereof, a lead compound is used as the allophanation catalyst.

On the other hand, in JP-A 61-151179, there is disclosed an isocyanuration reaction. In the Example thereof, zirconium butoxide is used as a catalyst for the isocyanuration. However, when the polyisocyanate composition was produced according to the process disclosed in said Example, the production ratio of the allophanate group was found to be at most about 10%.

DISCLOSURE OF INVENTION

An object of the present invention is to find a new allophanation catalyst capable of giving a high production ratio of the allophanate group, and another object of the present invention is to produce an allophanate group-containing polyisocyanate composition using the same.

The present inventors have undertaken extensive studies to solve the foregoing problems, found a specific zirconium compound and established a process for producing a polyisocyanate composition using the same. Thereby, the present invention has been obtained.

That is, the present invention is as follows.

[1] A process for producing an allophanate group-containing polyisocyanate composition from at least one isocyanate compound selected from the group consisting of an aliphatic diisocyanate, an alicyclic diisocyanate and an isocyanate pre-polymer obtained from at least one diisocyanate selected from the group consisting of an aliphatic diisocyanate and an alicyclic diisocyanate, and a hydroxyl group-containing compound through an urethanation reaction and an allophanation reaction, characterized in that at least one compound selected from the group consisting of a zirconyl compound represented by the following formula (1),

wherein $R_1$ and $R_2$ are independently of each other an alkylcarboniumoxy group, an alkoxy group, an alkyl group, a halogen group or a hydrogen residual group of an inorganic acid, and a zirconium alcoholate represented by the following formula (2),

wherein $R_3$, $R_4$, $R_5$ and $R_6$ are independently of one another an alkyl group, an alkene group or an alkyne group, is used as a catalyst for the allophanation reaction.

[2] The process according to the above [1], wherein at least one zirconyl compound represented by the above formula (1) is used as a catalyst for the allophanation reaction.
[3] The process according to the above [1] or [2], wherein the allophanation reaction is carried out at a temperature of from 60 to 160° C.
[4] The process according to the above [2] or [3], wherein the zirconyl compound is a zirconyl carboxylate.
[5] The process according to any one of the above [1] to [4], wherein the allophanation reaction is terminated by using a stop agent.
[6] The process according to the above [5], wherein the stop agent is at least one acid compound of phosphoric acid.
[7] The process according to the above [6], wherein the acid compound of phosphoric acid is at least one compound selected from the group consisting of phosphoric acid, pyrophosphoric acid, metaphosphoric acid and polyphosphoric acid, which are substantially free from water.
[8] An allophanate group-containing polyisocyanate composition containing zirconium in an amount of from 0.001 to 200 ppm.
[9] A coating composition, which comprises the polyisocyanate composition according to the above [8] and a polyol.

BEST MODE FOR CARRYING OUT THE INVENTION

The present invention is explained in detail as follows.

In the process for producing a polyisocyanate composition in accordance with the present invention, the starting material includes an isocyanate compound and a hydroxyl group-containing compound.

As the isocyanate compound, at least one isocyanate compound selected from the group consisting of (a) an aliphatic diisocyanate, (b) an alicyclic diisocyanate and (c) an isocyanate pre-polymer obtained from at least one diisocyanate selected from the group consisting of an aliphatic diisocyanate and an alicyclic diisocyanate (as the case may be, such an isocyanate pre-polymer may be referred to as "isocyanate pre-polymer" for brevity) is used.

Examples of the aliphatic diisocyanate and the alicyclic diisocyanate are tetramethylene diisocyanate, pentamethylene diisocyanate, hexamethylene diisocyanate, trimethylhexamethylene diisocyanate, lysine diisocyanate, isophorone diisocyanate, xylylene diisocyanate, hydrogenated xylylene diisocyanate, hydrogenated diphenylmethane diisocyanate and 1,4-diisocyanate cyclohexane. Of these, hexamethylene diisocyanate, isophorone diisocyanate and hydrogenated xylylene diisocyanate are preferred because of industrial availability. Hexamethylene diisocyanate is the most preferred.

Examples of the isocyanate pre-polymer are those obtained by subjecting at least one diisocyanate selected from the group consisting of the aliphatic diisocyanate and the alicyclic diisocyanate to urethodionation, isocyanuration, biuret reaction or urethanation. Herein, urethodionation means reaction by which an urethodione group is produced, isocyanuration means reaction by which an isocyanurate group is produced and the biuret reaction means reaction by which a biuret group is produced. The urethodionation, isocyanuration, biuret reaction and urethanation can be carried out under reaction conditions known in the art.

The hydroxyl group-containing compound includes an alcohol and a phenol compound. In the present invention, it is permitted to use any one of them. Preferred is an alcohol. Examples thereof are as follows.

An alcohol having one hydroxyl group, namely, a monohydric alcohol, includes, for example, a saturated aliphatic alcohol such as methanol, ethanol, 1-propanol, 2-propanol, 1-butanol, 2-butanol, iso-butanol, 1-pentanol, 2-pentanol, isoamyl alcohol, 1-hexanol, 2-hexanol, 1-heptanol, 1-octanol, 2-ethyl-1-hexanol, 3,3,5-trimethyl-1-hexanol, tridecanol and pentadecanol; a saturated cyclic aliphatic alcohol such as cyclohexanol and cyclopentanol; and an unsaturated aliphatic alcohol such as allyl alcohol, butenol, hexenol and 2-hydroxyethyl acrylate.

An alcohol having two hydroxyl groups, namely, a diol, includes, for example, ethylene glycol, propanediol, 1,4-butanediol, 1,3-butanediol, 1,6-hexanediol, 1,4-hexanediol, 1,6-cyclohexanediol, 1,4-cyclohexanediol, methylpentanediol, cyclohexanedimethanol, methylpentanediol, neopentyl glycol, diethylene glycol, triethylene glycol, polyethylene glycol, polypropylene glycol and hydrogenated bisphenol A.

An alcohol having three hydroxyl groups, namely, a triol, includes, for example, glycerol, 2-methyl-2-hydroxymethyl-1,3-propanediol, 2,4-dihydroxy-3-hydroxymethylpentane and 1,2,6-hexanetriol.

An alcohol having four or more hydroxyl groups includes sugar alcohols, for example, a tetritol such as erithrose, a pentitol such as xylitol and a hexitol such as sorbitol.

Examples of the phenol compound are phenol, benzylphenol, o-cresol, p-cresol, catechol, ethylphenol, octylphenol, xylenol, naphthol, nonylphenol and bisphenol A.

Further, polyester polyol, polypropylene glycol, polyethylene glycol and polytetraethylene glycol, which are obtained from the above-mentioned alcohol or phenol compound as a starting material, are suitable as the hydroxyl group-containing compound in the present invention.

Furthermore, it is permitted to use a hydroxyl group-containing acrylic polyol as the hydroxyl group-containing compound.

The production of a polyisocyanate composition in accordance with the present invention can be carried out using the isocyanate compound and the hydroxyl group-containing compound as a starting material through an urethanation reaction and an allophanation reaction. Herein, the urethanation reaction means that one isocyanate group and one hydroxyl group are allowed to react with each other to produce an urethane group, and the allophanation reaction means reaction by which an allophanate group is produced from one isocyanate group and one urethane group.

Incidentally, in the present invention, in producing the allophanate group-containing polyisocyanate composition, the starting materials, namely, the isocyanate compound and the hydroxyl-group-containing compound are blended with each other, and the allophanation reaction may be carried out using an allophanation catalyst after completion of the urethanation reaction or in the course of the urethanation reaction. Alternatively, the urethanation reaction and the allophanation reaction may be carried out at the same time. Conditions under which both reactions are simultaneously carried out can be determined appropriately according to the allophanation reaction conditions mentioned below. From a viewpoint of reaction control, it is recommendable to carry out the allophanation reaction after completion of the urethanation reaction.

The molar ratio of the isocyanate group of the isocyanate compound to the hydroxyl group of the hydroxyl group-containing compound is generally from 2.1:1 to 100:1, preferably from 3:1 to 60:1, and more preferably from 5:1 to 40:1. When the molar ratio of the isocyanate group to the hydroxyl group is within the above-mentioned range, the production efficiency is good. Moreover, the reaction can be carried out to such an extent that no starting material, namely neither the isocyanate compound nor the hydroxyl group-containing compound remains, and an urethane group-containing organic compound which is a product of reaction between the isocyanate compound and the hydroxyl group-containing compound does not remain, and no gelation occurs.

The temperature for the urethanation reaction ranges suitably from 0 to 200° C., preferably from 20 to 170° C., and more preferably from 40 to 150° C. The reaction time is usually from 10 minutes to 24 hours, preferably from 20 minutes to 15 hours, and more preferably from 30 minutes to 10 hours. Under such conditions of the reaction temperature and the reaction time, side reactions can be controlled, and at the same time coloration of the obtained polyisocyanate composition can be diminished, and as a result, the production efficiency can be increased.

The urethanation reaction can be carried out in the presence or absence of a conventional urethanation catalyst such as a tin compound, a zinc compound, a bismuth compound, an amine compound and a zirconium compound. The zirconyl compound represented by the formula (1) or the zirconium alcoholate represented by the formula (2), which is used in the present invention, may be used also as the urethanation catalyst.

In the present invention, at least one compound selected from the group consisting of the zirconyl compound represented by the formula (1) and the zirconium alcoholate represented by the formula (2) is used as a catalyst for the allophanation reaction, which is referred to as allophanation catalyst. In order to obtain a polyisocyanate composition higher in production ratio of the allophanate group, it is recommendable to use the zirconyl compound.

The zirconyl compound is a compound having a structure of the following formula (1),

wherein $R_1$ and $R_2$ are independently of each other an alkylcarboniumoxy group, an alkoxy group, an alkyl group, a halogen group or a hydrogen residual group of an inorganic acid.

Herein, the alkylcarboniumoxy group means a residual group formed by removing hydrogen from an organic carboxylic acid. For example, when $R_1$ and $R_2$ in the formula (1) are each the alkylcarboniumoxy group, the zirconyl compound represents a zirconyl carboxylic acid salt. The organic carboxylic acid includes an aliphatic carboxylic acid, an alicyclic carboxylic acid, an unsaturated carboxylic acid, a hydroxyl group-containing carboxylic acid and a halogenated alkylcarboxylic acid, and in addition polybasic carboxylic acids such as a dicarboxylic acid and a tricarboxylic acid are included.

Specific examples of the zirconyl compound are a zirconyl halide, a zirconyl carboxylate, a zirconyl dialkyl, a zirconyl alcoholate, a zirconyl carbonate, zirconyl lead sulfate and a zirconyl nitrate. Of these, preferred is a zirconyl carboxylate.

Specific examples of the zirconyl carboxylate are saturated aliphatic carboxylates such as zirconyl formate, zirconyl acetate, zirconyl propionate, zirconyl butanoate, zirconyl pentanoate, zirconyl hexanoate, zirconyl caproate, zirconyl octanoate, zirconyl 2-ethylhexanoate, zirconyl decanoate, zirconyl dodecanoate, zirconyl teradecanoate and zirconyl pentadecanoate, saturated cyclic carboxylic acids such as zirconyl cyclohexanecarboxylate and zirconyl cyclopentanecarboxylate, mixtures of the above-mentioned carboxylates such as zirconyl naphthenate, unsaturated aliphatic carboxylates such as zirconyl oleate, zirconyl linolate and zirconyl linolenate, and aromatic carboxylates such as zirconyl benzoate, zirconyl toluylate and zirconyl diphenylacetate. Of these, particularly preferred are zirconyl naphthenate, zirconyl 2-ethylhexanoate and zirconyl acetate because of industrial availability.

The zirconium alcoholate is a compound having a structure represented by the following formula (2),

wherein $R_3$, $R_4$, $R_5$ and $R_6$ are independently of one another an alkyl group, an alkene group or an alkyne group.

An alcohol used as a material for the zirconium alcoholate includes, for example, saturated aliphatic alcohols such as methanol, ethanol, 1-propanal, 2-propanol, 1-butanol, 2-butanol, iso-butanol, 1-pentanol, 2-pentanol, isoamyl alcohol, 1-hexanol, 2-hexanol, 1-heptanol, 1-octanol, 2-ethyl-1-hexanol, 3,3,5-trimethyl-1-hexanol, tridecanol and pentadecanol, and unsaturated aliphatic alcohols such as ethanal, propanal, butanal and 2-hydroxyethyl acrylate. In addition, it is permitted to use polyhydric alcohols, for example, diols such as ethylene glycol, propanediol, 1,4- butanediol, 1,3-butanediol, 1,6-hexanediol, 1,4-hexanediol, 1,6-cyclohexanediol and 1,4-cyclohexanediol, and triols such as glycerol. Among the zirconium alcoholates, preferred are tetra-n-propoxyzirconium, tetraisopropoxyzirconium, tetra-n-propoxyzirconium and tetra-n-butoxyzirconium because of industrial availability.

The allophanation catalyst is added in an amount of from 0.0001 to 1% by mass, preferably from 0.0005 to 0.2% by mass and more preferably from 0.001 to 0.1% by mass, based on the sum of the isocyanate compound and the urethane group-containing organic compound.

As mentioned above, in the present invention, the time and manner for adding the allophanation catalyst are not particularly limited. For example, the allophanation catalyst may be added before the production of the urethane group-containing organic compound, namely, prior to the urethanation reaction between the isocyanate compound and the hydroxyl group-containing compound, or during the urethanation reaction between the isocyanate compound and the hydroxyl group-containing compound. Alternatively, the allophanation catalyst may be added after the production of the urethane group-containing organic compound. With respect to the addition manner, a pre-determined amount of the allophanation catalyst may be added collectively or divided in several parts to be added. Alternatively, it is possible to apply a manner comprising adding it continuously at a fixed addition speed.

In use, the allophanation catalyst may be diluted with an organic solvent, for example, an ester compound such as ethyl acetate and butyl acetate, a ketone compound such as acetone and methyl ethyl ketone, a hydrocarbon compound such as hexane, pentane and mineral spirits, an aromatic compound such as toluene and xylene and an alcohol compound such as ethanol, propanol, butanol and 1,3-butanediol.

The allophanation reaction is carried out preferably at a temperature of from 60 to 160° C., more preferably from 70 to 160° C. and much more preferably from 80 to 160° C. When the allophanation reaction is carried out at such a temperature, side reactions are diminished and coloration of the obtained polyisocyanate composition is controlled.

The allophanation reaction is carried out usually for a period of from 5 minutes to 24 hours, preferably from 10 minutes to 10 hours and more preferably from 20 minutes to 4 hours. When the allophanation reaction is carried out for such a period of time, the reaction can be controlled easily and the polyisocyanate composition can be produced with good production efficiency.

Incidentally, the progress of the allophanation reaction can be determined by measuring the refractive index of the reaction liquid or the isocyanate group content of the reaction liquid.

The allophanation catalyst used in the present invention is characterized in that the reaction can proceed relatively mildly. When the zirconyl compound represented by the formula (1) is used as the allophanation catalyst, there can be obtained advantages such that any side reaction such as an isocyanuration reaction can hardly occur almost after completion of the allophanation reaction, in other words, almost after completion of the conversion from the urethane group to the allophanate group. On the contrary, when a lead compound or the like is used as the allophanation catalyst, as the case may be, a rapid isocyanuration reaction occurs to make reaction control difficult almost after completion of the reaction of the urethane group-containing organic compound.

In the production of the allophanate group-containing polyisocyanate composition in accordance with the present invention, it is desired that side reactions other than the allophanation reaction occur as little as possible. As the side reaction, an isocyanuration reaction easily occurs, so that the obtained polyisocyanate composition is affected in physical properties due to existence of the isocyanurate group, which is a side reaction product. Therefore, how to diminish the isocyanuration reaction which occurs as a side reaction at the same time is important for obtaining the desired polyisocyanate composition high in the production ratio of the allophanate group.

In the production process in accordance with the present invention, when the production ratio of the desired allophanate group in the allophanation reaction is expressed in terms of a production molar ratio of the allophanate group to the isocyanurate group, the allophanate group production mol/isocyanurate group production mol is preferably not less than 80/20 (the production ratio of the allophanate group being 80% or more), and more preferably not less than 90/10 (the production ratio of the allophanate group being 90% or more).

The production molar ratio of the allophanate group and the isocyanurate group can be measured by means of 1H-NMR. The following is an example of a method of measuring a polyisocyanate composition obtained using hexamethylene diisocyanate as the isocyanate compound and an isocyanate pre-polymer obtained therefrom by means of 1H-NMR. The production molar ratio of the allophanate group to the isocyanurate group referred to in the present specification is measured under the following conditions.

Example of measurement method by means of 1H-NMR: The polyisocyanate composition is dissolved in deuterium chloroform to obtain 10% by mass concentration (tetramethylsilane is added in an amount of 0.03% by mass based on the polyisocyanate composition). As for the chemical shift standard, a signal of the hydrogen of tetramethylsilane is taken as 0 ppm. Through measurement by means of 1H-NMR, a signal area ratio between a signal area of a hydrogen atom bound to nitrogen of the allophanate group in the vicinity of 8.5 ppm (1 mol of a hydrogen atom to 1 mol of the allophanate group) and a signal area of a hydrogen atom of a methylene group adjacent to the isocyanurate group in the vicinity of 3.85 ppm (6 mol of hydrogen to 1 mol of the isocyanurate group) is obtained.

Production mol of allophanate group/production mol of isocyanurate group=(signal area in the vicinity of 8.5 ppm)/[(signal area in the vicinity of 3.85 ppm)/6]

The urethanation reaction and the allophanation reaction can be carried out in the absence of any solvent. If necessary, an organic solvent having no group reactive to the isocyanate group, such as butyl acetate, methyl ethyl ketone, toluene and xylene can be used as the solvent.

In carrying out the allophanation reaction, it is permitted to add a tertiary alcohol such as tert-butanol and a phenolic hydroxyl group-containing compound such as di-tert-butylhydroxytoluene as a co-catalyst.

In the present invention, it is recommendable to terminate the allophanation reaction by using a stop agent. Although the allophanation reaction is discontinued at the time when the urethane group-containing organic compound disappears, the stop agent can be added to make the production conditions stable and moreover to improve product stability.

As the stop agent, an acid compound such as an acid compound of phosphoric acid, sulfuric acid, nitric acid, chloroacetic acid, benzoyl chloride and a sulfonic acid ester agent, an ion exchange resin, a chelating agent and a chelating resin can be used. Among these, the acid compound of phosphoric acid is preferred, because there is little possibility of corrosion of a reactor material such as stainless steel and a residue of the stop agent can be easily removed.

Herein, examples of the acid compound of phosphoric acid are phosphoric acid, pyrophosphoric acid, metaphosphoric acid, polyphosphoric acid and their alkyl esters. In the present invention, it is preferred to use at least one selected from those acid compounds of phosphoric acid.

In the case where a stop agent free from water is used, there is an effect such that a reaction product between the stop agent and the catalyst can be easily deposited, so that the reaction product between the stop agent and the catalyst hardly remains in the polyisocyanate composition. In the case where a stop agent free from water is used, there is also an effect such that a reaction product between water and the isocyanate compound does not contaminate the polyisocyanate composition, and as a result the polyisocyanate is not increased in its viscosity and is not deteriorated in its dilution property to an organic solvent. Incidentally, in the present invention, the term, "free from water" means that water may be contained to the extent that the above-mentioned effects are obtained. A water content as a guide is less than 5.0% by mass, preferably less than 2.0% by mass, and more preferably less than 0.50% by mass, based on the stop agent.

In conclusion, in the present invention, it is particularly preferred that the above-mentioned acid compound of phosphoric acid to be used as the stop agent is at least one compound selected from the group consisting of phosphoric acid, pyrophosphoric acid, metaphosphoric acid and polyphosphoric acid, which are substantially free from water.

Incidentally, water-free phosphoric acid and metaphosphoric acid are each a crystal, and water-free pyrophosphoric acid and polyphosphoric acid are each a viscous liquid, and therefore it is difficult to use them as they are. Usually, in use, they are dissolved in a solvent. The solvent dissolving the substantially water-free phosphoric acid, pyrophosphoric acid and polyphosphoric acid includes, for example, a ketone, an ether and an ester. Particularly preferred examples thereof are alcohols such as methanol, ethanol, n-propanol, isopropanol, n-butanol, isobutanol, amyl alcohol, 1-hexanol and 2-ethyl-1-hexanol.

The stop agent is added in an amount of preferably from 0.20 to 1000 times mol, more preferably from 0.5 to 50 times mol, and much more preferably from 1.0 to 20 times mol per mol of the allophanation catalyst.

After termination of the allophanation reaction, if desired, the unreacted aliphatic diisocyanate or alicyclic diisocyanate can be distilled according to, for example, a falling-film evaporation process or a solvent-extraction process, and then used.

According to the reaction in the present invention, all of the urethanation reaction step, the allophanation reaction step, and if necessary, the reaction termination step can be carried out in one reactor. Alternatively, using two reactors connected with each other, the reaction can be carried out in a manner such that the urethanation reaction step is carried out independently from the step comprising the allophanation reaction, and if necessary, the reaction termination, or the step comprising the urethanation reaction and the allophanation reaction are carried out independently from the reaction termination step. Further, the reaction can be carried out in a continuous manner by arranging a plurality of reactors side by side.

The present invention also provides an allophanate group-containing polyisocyanate composition containing zirconium in an amount of from 0.001 to 200 ppm. The zirconium content in the polyisocyanate composition is preferably from 0.001 to 100 ppm, and more preferably from 0.001 to 20 ppm. The reason is as follows. When the zirconium remaining in the polyisocyanate composition exceeds 200 ppm, the storage stability of the composition has a detrimental effect. If there is any, but not more than 200 ppm, the storage stability can be kept excellent.

The polyisocyanate composition having such a low zirconium content can be obtained, for example, by using a catalyst containing the zirconyl compound represented by the above-mentioned formula (1). Particularly in order to make the zirconium content not more than 200 ppm, it is recommendable to use at least one compound selected from the group consisting of phosphoric acid, pyrophosphoric acid, metaphosphoric acid and polyphosphoric acid, which is substantially free from water, as the stop agent. Further, from a viewpoint of facilities for handling, it is recommendable to use water-free phosphoric acid or pyrophosphoric acid diluted with an alcohol such as methanol, isobutanol or octanol.

Zirconium contained in the polyisocyanate composition in an amount of not less than 10 ppm can serve as an urethanation catalyst, thereby exhibiting an effect that the reaction speed of a polyurethane coating material is increased. It is too high in cost to decrease the zirconium content to not more than 0.001 ppm, and so it is not practical.

Further, the present invention provides a coating composition, which comprises the allophanate group-containing polyisocyanate composition obtained according to the above-mentioned process, particularly the allophanate group-containing polyisocyanate composition having a zirconium content of not more than 200 ppm, and a polyol. That is, such a coating composition is a two component polyurethane coating composition prepared by incorporating the polyisocyanate composition as a hardening agent to a polyol as a base resin.

The polyol used in the present invention includes a polyol having two or more hydroxyl groups in a molecule, which has been used as a base resin in the field of a two component polyurethane coating composition. Examples thereof are one of aliphatic hydrocarbon polyols, fluorine polyols, polyether polyols, polyester polyols, polycarbonate polyols, epoxy resins, acrylic polyols and alkyd polyols, and a mixture thereof. Particularly more preferred are fluorine polyols and acrylic polyols, because of their superior weather resistance. Those polyols can be obtained in a conventional manner such as solution polymerization and a condensation reaction.

Taking toughness and smoothness of a coating film into consideration, the polyol used in the present invention has a hydroxyl value of preferably from 1 to 300 mg KOH/g, more preferably from 10 to 150 mg KOH/g, and much more preferably from 20 to 100 mg KOH/g.

The equivalent ratio of the isocyanate group to the hydroxyl group in the polyol and the polyisocyanate composition used in the present invention is from 0.3 to 5.0, preferably from 0.4 to 3.0, and more preferably from 0.5 to 2.0. When the equivalent ratio of the isocyanate group to the hydroxyl group is within said range, a tough coating can be obtained.

The polyisocyanate composition and the coating composition in accordance with the present invention can be used in a combination with an organic solvent. In this case, it is important that the organic solvent has no functional group reactive to either the hydroxyl group or the isocyanate group. Further, it is important that the organic solvent is compatible with the polyisocyanate composition and the polyol. As such an organic solvent, it is permitted to use those generally used as a coating solvent, such as ester compounds, ether compounds, ketone compounds, aromatic compounds, polyethylene glycol dialkyl ether compounds and polyethylene glycol dicarboxylate compounds.

Depending upon purposes and uses, the polyisocyanate composition can be used in combination with various additives used in the art, such as a catalyst for acceleration of curing or the like, a pigment, a levelling agent, an antioxidant, an ultraviolet absorber, a light stabilizer, a plasticizer, a surfactant and a surface treating agent.

According to the process for producing a polyisocyanate composition in accordance with the present invention, a polyisocyanate composition high in production ratio of the allophanate group can be obtained. Thus, there can be obtained a polyisocyanate composition fully exhibiting the characteristic feature peculiar to the allophanate group-containing compound.

Further, in the present invention, it is possible to obtain a polyisocyanate composition, which is low in its viscosity, or which is high in the number of functional groups and high in its cross-linkability, or which is easily soluble in a low polarity organic solvent, by appropriately selecting the hydroxyl group-containing compound or the like. Incidentally, as mentioned above, when contamination with by-products caused by the isocyanuration reaction or the like becomes great, the physical properties of the products are greatly affected, so that a polyisocyanate composition having physical properties according to the design of the molecule can hardly be obtained. For example, even when a polyisocyanate composition is designed to have a low viscosity according to the design of the molecule, the molecular weight may increase, and as a result, a polyisocyanate composition having a viscosity higher than that designed is produced. For that reason, it is desired to apply conditions under which the production ratio of the allophanate group is increased with a decrease in the ratio of the side reaction.

Furthermore, the polyisocyanate composition obtained according to the process in accordance with the present invention is also characterized in that the coloration degree of the composition obtained is low.

Still further, the coating composition comprising a component of the above-mentioned allophanate group-containing polyisocyanate composition and another component of the polyol can be extensively applied for uses such as a two composition polyurethane coating material, particularly a high solids type low polarity organic solvent soluble coating material, a sealing agent, an adhesive agent, an ink, a coating agent, a casting agent, an elastomer, a foam, a material for plastics and a fiber treating agent.

EXAMPLE

The process for producing an allophanate group-containing polyisocyanate composition and the coating composition in accordance with the present invention are explained with reference to the following Examples.

As the isocyanate compound, one of the starting materials, hexamethylene diisocyante (a commercial name of "Duranate 50 M", manufactured by Asahi Chemical Industry Co., Ltd.) was used.

The production molar ratio of the allophanate group to the isocyanurate group in the reaction liquid was obtained from a signal area ratio between a signal of a hydrogen atom bound to nitrogen of the allophanate group in the vicinity of 8.5 ppm and a signal of a hydrogen atom of a methylene group adjacent to the isocyanurate group in the vicinity of 3.85 ppm, which were measured using 1H-NMR (FT-NMR DPX-400, manufactured by Bruker Co.). Detailed measurement conditions are as follows.

Measurement temperature: ambient temperature; Sample concentration: 10% by mass; Solvent: deuterium chloroform; Integration frequency: 128; Waiting time: 3.0 seconds; Chemical shift standard: hydrogen of tetramethylsilane: 0 ppm.

The zirconium content in the obtained composition was measured according to an inductively coupled plasma emission spectrochemical analysis (analysis instrument: IRIS/AP, manufactured by Thermo Jarrell Ash).

The color of the reaction liquid and the polyisocyanate composition was each measured using a standard matching solution prepared by the method prescribed in JIS K 0071-1 (1998). More specifically, the measurement was carried out as follows. 1.245 Grams of potassium hexachloroplatinate (IV) and 1.000 g of cobalt chloride (II) hexahydrate were weighed and added to 100 ml of concentrated hydrochloric acid to obtain a solution. The solution was diluted to make the volume 1000 ml, thereby obtaining a standard matching original solution (corresponding to Hazen color number 500), and 2 ml, 4 ml, 6 ml, 8 ml, 10 ml, 12 ml, 14 ml, 16 ml, 18 ml and 20 ml taken therefrom were diluted to 100 ml, respectively, thereby obtaining each standard Hazen matching solution of color number 10, 20, 30, 40, 50, 60, 70, 80, 90 or 100. Using these, the chromaticity of the reaction liquid was visually confirmed. The color number of the standard matching solution that was the most close to the reaction solution or the polyisocyanate was taken as a value of the Hazen color number.

Viscosity was measured at 25° C. using an E type vicosimeter (TOKIMEC INC.). The rotating number of a standard rotor (1° 34'×R24) at the time of measurement is as follows.

100 r.p.m. (when viscosity is less than 128 mPa.s)
50 r.p.m. (when viscosity is from 128 to 256 mPa.s)
20 r.p.m. (when viscosity is from 256 to 640 mPa.s)
10 r.p.m. (when viscosity is from 640 to 1280 mPa.s)
5 r.p.m. (when viscosity is from 1280 to 2560 mPa.s)

The NCO content in the polyisocyanate composition was measured in a manner such that the isocyanate group was neutralized using an excess amount of 2 N amine, and a back titration was carried out using 1 N hydrochloric acid.

Example 1

In a four necked flask equipped with a stirrer, a thermometer and a cooling pipe, 300.0 g of hexamethylene diisocyanate and 20.4 g of isobutanol were fed, and an urethanation reaction was carried out under stirring at 90° C. for 60 minutes. The temperature was raised to 130° C. Thereafter, 0.26 g of a mineral spirits solution of zirconyl 2-ethylhexanoate having a solids content of 20% (a commercial name of Nikka Octhix Zirconium 12%, manufactured by Nihon Kagaku Sangyo Co., Ltd., diluted with mineral spirits) was added thereto as an allophanation catalyst, and an allophanation reaction was carried out. After 60 minutes, at the time when an increase of the refractive index of the reaction liquid reached 0.008, 0.046 g (2.0 times mol per mol of the allophanation catalyst) of an isobutanol solution of pyrophosphoric acid having a solids content of 50% (a reagent manufactured by Katayama Chemical Industries Co., Ltd., diluted with isobutanol)(water content 0.10%) was added thereto to terminate the reaction. A cloudy reaction liquid was filtered using a 1 μm filter. Thereby, the reaction liquid was turned into a transparent liquid.

As a result of 1H-NMR measurement of the reaction liquid obtained, the production molar ratio of the allophanate group to the isocyanurate group and the chromaticity of the reaction liquid were found to be allophanate group/isocyanurate group=97.1/2.9 and Hazen color number=10, respectively.

Using a falling-film evaporating apparatus, unreacted hexamethylene diisocyanate was removed therefrom under conditions of a first time 160° C. (0.2 Torr) and a second time 150° C. (0.1 Torr).

Thereby, 103.0 g of a polyisocyanate composition was obtained. The polyisocyanate composition was a pale yellow transparent liquid of Hazen color number 10, and found to have a viscosity of 120 mPa.s (25° C.) and an NCO content of 19.0%. Measurement of zirconium remaining in the polyisocyanate composition revealed a value of not more than 0.1 ppm.

The obtained polyisocyanate composition was stored at 50° C. for one month, and then a decrease in the NCO content and an increase in the viscosity were found to be only 0.1% and only 10 mPa.s, respectively.

Example 2

In the same apparatus as in Example 1, 561.9 g of hexamethylene diisocyanate and 38.1 g of isobutanol were fed, and an urethanation reaction was carried out under stirring at 90° C. for 60 minutes. The temperature was raised to 120° C. Thereafter, 0.28 g of a mineral spirits solution of zirconyl 2-ethylhexanoate having a solids content of 20% was added thereto as an allophanation catalyst. After 60 minutes, at the time when an increase of the refractive index of the reaction liquid reached 0.008, 0.097 g (6 times mol per mol of the allophanation catalyst) of an aqueous solution of phosphoric acid having a solids content of 85% (a reagent manufactured by Kishida Chemical Co., Ltd.) was added thereto to terminate the reaction. A cloudy reaction liquid was filtered using a 1 μm filter. Thereby, the reaction liquid was turned into a pale yellow transparent liquid.

As a result of 1H-NMR measurement of the reaction liquid obtained, the production molar ratio of the allophanate group to the isocyanurate group was found to be allophanate group/isocyanurate group=97.3/2.7.

Using a falling-film evaporating apparatus, unreacted hexamethylene diisocyanate was removed therefrom under the same conditions as in Example 1.

The resulting polyisocyanate composition was a pale yellow transparent liquid, obtained in a yield of 202.8 g, and found to have a viscosity of 130 mPa.s and an NCO content of 18.8%.

Example 3

In the same apparatus as in Example 1, 500 g of hexamethylene diisocyanate and 26.0 g of 2-ethylhexanol were fed, and an urethanation reaction was carried out under stirring at 90° C. for 60 minutes. Successively, 1.0 g of a mineral spirits solution of zirconyl 2-ethylhexanoate having a solids content of 20% was added thereto 90° C. as an allophanation catalyst. After 60 minutes, at the time when an increase of the refractive index of the reaction liquid reached 0.0035, 0.66 g (4 times mol per mol of the allophanation catalyst) of 2-ethylhexyl phosphate (a commercial name of "DP-8R", manufactured by Daihachi Chemical Industry Co., Ltd.) was added thereto to terminate the reaction.

As a result of 1H-NMR measurement of the reaction liquid obtained, the production molar ratio of the allophanate group to the isocyanurate group was found to be allophanate group/isocyanurate group=96.5/3.5

Using a falling-film evaporating apparatus, unreacted hexamethylene diisocyanate was removed therefrom under the same conditions as in Example 1.

The resulting polyisocyanate composition was a transparent liquid, obtained in a yield of 84.2 g, and found to have a viscosity of 110 mPa.s and an NCO content of 17.6%.

Example 4

In the same apparatus as in Example 1, 600.0 g of hexamethylene diisocyanate and 25.5 g of diethylene glycol were fed, and an urethanation reaction was carried out under stirring at 130° C. for 70 minutes. Successively, 0.27 g of a mineral spirits solution of zirconyl 2-ethylhexanoate having a solids content of 20% was added thereto at 130° C. as an allophanation catalyst. After 60 minutes, at the time when an increase of the refractive index of the reaction liquid reached 0.0065, 0.096 g (6 times mol per mol of the allophanation catalyst) of an aqueous solution of phosphoric acid having a solids content of 85% was added thereto to terminate the reaction. A cloudy reaction liquid was filtered using a 1 μm filter. Thereby, the reaction liquid was turned into a pale yellow transparent liquid.

As a result of 1H-NMR measurement of the reaction liquid obtained, the production molar ratio of the allophanate group to the isocyanurate group was found to be allophanate group/isocyanurate group=97.8/2.2.

Using a falling-film evaporating apparatus, unreacted hexamethylene diisocyanate was removed therefrom under the same conditions as in Example 1.

The resulting polyisocyanate composition was a pale yellow transparent liquid, obtained in a yield of 181.0 g, and found to have a viscosity of 1450 mPa.s and an NCO content of 19.8%. The content of zirconium remaining in the polyisocyanate composition was found to be 64 ppm.

The polyisocyanate composition was stored at 50° C. for one month, and then a decrease in the NCO content and an increase in the viscosity were found to be only 0.3% and only 200 mPa.s, respectively.

Example 5

In the same apparatus as in Example 1, 100 g of hexamethylene diisocyanate and 10.0 g of isobutanol were fed, and an urethanation reaction was carried out under stirring at 90° C. for 60 minutes. Successively, 0.25 g of a mineral spirits solution of zirconyl 2-ethylhexanoate having a solids content of 20% was added thereto at 90° C. as an allophanation catalyst. After 60 minutes, at the time when an increase of the refractive index of the reaction liquid reached 0.01, 0.088 g (6 times mol per mol of the allophanation catalyst) of an aqueous solution of phosphoric acid having a solids content of 85% was added thereto to terminate the reaction. A cloudy reaction liquid was filtered using a 1 μm filter. Thereby, the reaction liquid was turned into a pale yellow transparent liquid. As a result of 1H-NMR measurement for the reaction liquid obtained, the production molar ratio of the allophanate group to the isocyanurate group was found to be allophanate group/isocyanurate group=95.5/4.5. No purification was carried out.

Example 6

In the same apparatus as in Example 1, 100.0 g of hexamethylene diisocyanate and 10.0 g of isobutanol were fed, and an urethanation reaction was carried out under stirring at 85° C. for 60 minutes. Successively, 0.65 g of a mineral spirits solution of zirconyl 2-ethylhexanoate having a solids content of 20% was added thereto at 85° C. as an allophanation catalyst. After 150 minutes, at the time when an increase of the refractive index of the reaction liquid reached 0.01, 0.228 g (5.9 times mol per mol of the allophanation catalyst) of an aqueous solution of phosphoric acid having a solid contents of 85% was added thereto to terminate the reaction. A cloudy reaction liquid was filtered using a 1 µm filter. Thereby, the reaction liquid was turned into a pale yellow transparent liquid. As a result of 1H-NMR measurement for the reaction liquid obtained, the production molar ratio of the allophanate group to the isocyanurate group was found to be allophanate group/isocyanurate group=96.1/3.9. Chromaticity of the reaction liquid was found to be 10 in terms of Hazen color number.

No purification was carried out.

Example 7

In the same apparatus as in Example 1, 100.0 g of hexamethylene diisocyanate and 10.0 g of isobutanol were fed, and an urethanation reaction was carried out under stirring at 90° C. for 60 minutes. After raising the temperature to 140° C., 0.033 g of a mineral spirits solution of zirconyl 2-ethylhexanoate having a solids content of 20% was added thereto as an allophanation catalyst. After 60 minutes, at the time when an increase of the refractive index of the reaction liquid reached 0.01, 0.011 g (6 times mol per mol of the allophanation catalyst) of an aqueous solution of phosphoric acid having a solids content of 85% was added thereto to terminate the reaction. A cloudy reaction liquid was filtered using a 1 µm filter. Thereby, the reaction liquid was turned into a pale yellow transparent liquid. As a result of 1H-NMR measurement for the reaction liquid obtained, the production molar ratio of the allophanate group to the isocyanurate group was found to be allophanate group/isocyanurate group=98.2/2.8. No purification was carried out.

Example 8

In the same apparatus as in Example 1, 100.0 g of hexamethylene diisocyanate and 10.0 g of isobutanol were fed, and an urethanation reaction was carried out under stirring at 90° C. for 60 minutes. Successively, 0.15 g of a 1-butanol solution of zirconyl tetra-n-propoxide having a solids content of 20% (a reagent manufactured by Sigma Aldrich Japan, K.K. diluted with 1-butanol) was added thereto at 90° C. as an allophanation catalyst. After 60 minutes, at the time when an increase of the refractive index of the reaction liquid reached 0.01, 0.14 g (4 times mol per mol of the allophanation catalyst) of an aqueous solution of phosphoric acid having a solids content of 85% was added thereto to terminate the reaction. A cloudy reaction liquid was filtered using a 1 µm filter. Thereby, the reaction liquid was turned into a pale yellow transparent liquid. Chromaticity of the reaction liquid was found to be 10 in terms of Hazen color number.

As a result of 1H-NMR measurement for the reaction liquid obtained, the production molar ratio of the allophanate group to the isocyanurate group was found to be allophanate group/isocyanurate group=87.1/12.9.

No purification was carried out.

Example 9

In the same apparatus as in Example 1, 100.0 g of hexamethylene diisocyanate and 10.0 g of isobutanol were fed, and an urethanation reaction was carried out under stirring at 90° C. for 60 minutes. Successively, 0.65 g of a mineral spirits solution of zirconyl naphthenate having a solids content of 20% (a commercial name of "Naphthex Zirconium 4%", manufactured by Nihon Kagaku Sangyo Co., Ltd., diluted with mineral spirits) was added thereto as an allophanation catalyst. After 80 minutes, at the time when an increase of the refractive index of the reaction liquid reached 0.01, 0.15 g (4 times mol per mol of the allophanation catalyst) of an aqueous solution of phosphoric acid having a solids content of 85% was added thereto to terminate the reaction. A cloudy reaction liquid was filtered using a 1 µm filter. Thereby, the reaction liquid was turned into a pale yellow transparent liquid.

As a result of 1H-NMR measurement for the reaction liquid obtained, the production molar ratio of the allophanate group to the isocyanurate group was found to be allophanate group/isocyanurate group=95.7/4.3. Chromaticity of the reaction liquid was found to be 10 in terms of Hazen color number.

No purification was carried out.

Example 10

In the same apparatus as in Example 1, 600.0 g of hexamethylene diisocyanate and 14.8 g of ethylene glycol were fed, and an urethanation reaction was carried out under stirring at 130° C. for 60 minutes. Successively, 0.68 g of a mineral spirits solution of zirconyl 2-ethylhexanoate having a solids content of 20% was added thereto as an allophanation catalyst. After 60 minutes, at the time when an increase of the refractive index of the reaction liquid reached 0.0065, 0.12 g (2.2 times mol per mol of the allophanation catalyst) of an isobutanol solution of pyrophosphoric acid having a solids content of 50% was added thereto to terminate the reaction. The reaction liquid was cloudy. When filtered using a 1 µm filter, the reaction liquid was turned into a pale yellow transparent liquid.

As a result of 1H-NMR measurement for the reaction liquid obtained, the production molar ratio of the allophanate group to the isocyanurate group was found to be allophanate group/isocyanurate group=96.9/3.1.

Using a falling-film evaporating apparatus, unreacted hexamethylene diisocyanate was removed therefrom under the same conditions as in Example 1.

The resulting polyisocyanate composition was a pale yellow transparent liquid, obtained in a yield of 166.0 g, and found to have a viscosity of 1800 mPa.s and an NCO content of 21.0%. The content of zirconium remaining in the polyisocyanate composition was found to be 5 ppm.

The polyisocyanate composition was stored at 50° C. for one month, and then a decrease in the NCO content and an increase in the viscosity were found to be only 0.2% and only 100 mPa.s, respectively.

Comparative Example 1
(Comparative Experiment in which the Same Catalyst as Used in Example 5 of British Patent No. 994,890 was Used)

In the same apparatus as in Example 1, 100.0 g of hexamethylene diisocyanate and 10 g of isobutanol were fed, and an urethanation reaction was carried out under stirring at 90° C. for 60 minutes. Successively, 1.52 g of a mineral spirits solution of zinc naphthenoate having a solids content of 20% was added thereto at 90° C. as an allophanation catalyst. The reaction was continued for 2 hours and 30 minutes. However, the increase of the refractive index of the reaction liquid observed was only 0.0028. At this time, 0.32 g (4.2 times mol per mol of the allophanation catalyst)

of an aqueous solution of phosphoric acid having a solids content of 85% was added thereto to terminate the reaction.

As a result of 1H-NMR measurement of the reaction liquid obtained, the production molar ratio of the allophanate group to the isocyanurate group was found to be allophanate group/isocyanurate group=44.5/55.5. Chromaticity of the reaction liquid was found to be 10 in terms of Hazen color number. No purification was carried out.

Comparative Example 2

In the same apparatus as in Example 1, 100.0 g of hexamethylene diisocyanate and 10.0 g of isobutanol were fed, and an urethanation reaction was carried out under stirring at 90° C. for 60 minutes. Successively, 0.40 g of a mineral spirits solution of lead 2-ethylhexanoate having a solids content of 20% (a commercial name of "Nikka Octhix Lead 20%", manufactured by Nihon Kagaku Sangyo Co., Ltd., diluted with mineral spirits) was added thereto at 90° C. as an allophanation catalyst. After 1 hour, from the time when the increase in the refractive index exceeded 0.01, heat revolution rapidly occurred to make control of the reaction difficult. Therefore, 0.42 g (4 times mol per mol of the allophanation catalyst) of 2-ethylhexyl phosphate was added thereto to terminate the reaction. The increase in the refractive index reached 0.0122.

As a result of 1H-NMR measurement of the reaction liquid when the increase in its refractive index reached 0.01, the production molar ratio of the allophanate group to the isocyanurate group was found to be allophanate group/isocyanurate group=97.0/3.0. As a result of 1H-NMR measurement of the reaction liquid when the increase in its refractive index reached 0.0122, the production molar ratio of the allophanate group to the isocyanurate group was found to be allophanate group/isocyanurate group=91.0/9.0. From the results, it was found that an isocyanuration reaction rapidly occurred from the time when an increase in the refractive index exceeded 0.01.

Chromaticity of the reaction liquid was found to be 10 in terms of Hazen color number.

Comparative Example 3

In the same apparatus as in Example 1, 100 g of hexamethylene diisocyanate and 10 g of isobutanol were fed, and an urethanation reaction was carried out under stirring at 90° C. for 60 minutes. Then, 0.75 g of an ethanol solution of zirconium acetylacetonate having a solids content of 20% (Kishida Chemical Co., Ltd., diluted with ethanol to make a solids content of 20%) was added thereto at 90° C. The reaction was continued for 3 hours. However, almost no reaction proceeded (an increase of the refractive index was only 0.001). At this time, 0.23 g (4 times mol per mol of the allophanation catalyst) of an aqueous solution of phosphoric acid having a solids content of 85% was added thereto to terminate the reaction. The reaction liquid was cloudy. When filtered using a 1 μm filter, the reaction liquid was turned into a pale yellow transparent liquid.

As a result of 1H-NMR measurement for the reaction liquid, the production molar ratio of the allophanate group to the isocyanurate group was found to be allophanate group/isocyanurate group=7.3/92.7. Chromaticity of the reaction liquid was found to be 30 in terms of Hazen color number. No purification was carried out.

Comparative Example 4

In the same apparatus as in Example 1, 100 g of hexamethylene diisocyanate and 10 g of isobutanol were fed, and an urethanation reaction was carried out under stirring at 90° C. for 60 minutes. Then, 1.96 g of a mineral spirits solution of zinc 2-ethylhexanoate having a solids content of 20% (a commercial name of "Nikka Octhix Zinc 18%", manufactured by Nihon Kagaku Sangyo Co., Ltd., diluted with mineral spirits) was added thereto at 90° C. as an allophanation catalyst. The reaction was continued for 3 hours. As a result, the refractive index increased by 0.004. At this time, 1.33 g (4 times mol per mol of the allophanation catalyst) of 2-ethylhexyl phosphate was added thereto to terminate the reaction.

As a result of 1H-NMR measurement for the reaction liquid, the production molar ratio of the allophanate group to the isocyanurate group was found to be allophanate group/isocyanurate group=59.9/40.1. Chromaticity of the reaction liquid was found to be 80 in terms of Hazen color number. No purification was carried out.

Industrial Applicability

According to the process for producing a polyisocyanate composition in accordance with the present invention, there can be obtained a polyisocyanate composition high in production ratio of an allophanate group. That is, according to the process of the present invention, it is possible to make the production ratio of an allophanate group not less than 95% when quantitatively analyzed by means of 1H-NMR. Therefore, the polyisocyanate composition obtained by the process of the present invention can fully exhibit characteristic features peculiar to an allophanate group-containing compound.

Further, the polyisocyanate composition produced by the process in accordance with the present invention has an advantage that the degree of coloration is low.

Still further, the polyisocyanate composition in accordance with the present invention can be markedly improved in its storage stability when the zirconium content is controlled to not more than 200 ppm.

Additionally, a coating composition comprising the allophanate group-containing polyisocyanate composition and a polyol can be extensively applied for uses such as a two composition polyurethane coating material, particularly a high solids type low polarity organic solvent soluble coating material, a sealing agent, an adhesive agent, an ink, a coating agent, a casting agent, an elastomer, a foam, a material for plastics and a fiber treating agent.

What is claimed is:

1. A process for producing an allophanate group-containing polyisocyanate composition from at least one isocyanate compound selected from the group consisting of an aliphatic diisocyanate, an alicyclic diisocyanate and an isocyanate pre-polymer obtained from at least one diisocyanate selected from the group consisting of an aliphatic diisocyanate and an alicyclic diisocyanate, and a hydroxyl group-containing compound through an urethanation reaction and an allophanation reaction, wherein at least one compound selected from the group consisting of a zirconyl carboxylate represented by the following formula (1),

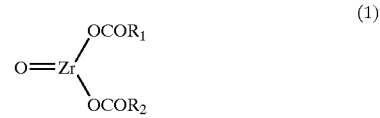

wherein $R_1$ and $R_2$ are independently of each other an alkyl group, is used as a catalyst for the allophanation reaction.

2. The process according to claim 1, wherein the allophanation reaction is carried out at a temperature of from 60 to 160° C.

3. The process according to claim 1, wherein the allophanation reaction is terminated by using a stop agent.

4. The process according to claim 3, wherein the stop agent is at least one acid compound of phosphoric acid.

5. The process according to claim 4, wherein the acid compound of phosphoric acid is at least one compound selected from the group consisting of phosphoric acid, pyrophosphoric acid, metaphosphoric acid and polyphosphoric acid, which are substantially free from water.

* * * * *

UNITED STATES PATENT AND TRADEMARK OFFICE
CERTIFICATE OF CORRECTION

PATENT NO. : 6,888,028 B2
DATED : May 3, 2005
INVENTOR(S) : Shinichiro Watanabe et al.

It is certified that error appears in the above-identified patent and that said Letters Patent is hereby corrected as shown below:

Title page,
Item [54], Title, should read:
-- PROCESS FOR PREPARATION OF POLYISOCYANATE COMPOSITION --.

Signed and Sealed this

Thirty-first Day of January, 2006

JON W. DUDAS
*Director of the United States Patent and Trademark Office*